United States Patent [19]
Takagaki et al.

[11] Patent Number: 5,606,844
[45] Date of Patent: Mar. 4, 1997

[54] PROCESS FOR PRODUCING A SELF-SUPPORTING PACKAGE HAVING AN OUTLET STOPPER AND AN APPARATUS FOR PRODUCING SAID PACKAGE

[75] Inventors: Tadao Takagaki; Yasuo Noguchi; Mituharu Katayama, all of Tokyo, Japan

[73] Assignee: Sumitomo Bakelite Company, Limited, Tokyo, Japan

[21] Appl. No.: 353,431

[22] Filed: Dec. 9, 1994

[30] Foreign Application Priority Data

Dec. 27, 1993 [JP] Japan .................................. 5-348634
May 31, 1994 [JP] Japan .................................. 6-118708

[51] Int. Cl.⁶ ................................................ B65B 61/00
[52] U.S. Cl. ........................ 53/410; 53/DIG. 2; 53/133.2
[58] Field of Search .......................... 53/410, 420, 459, 53/455, 562, 478, 479, 133.1, 133.2, 133.3, 133.4, DIG. 2; 493/87, 212, 213; 156/580.1, 580.2, 73.1, 514

[56] References Cited

U.S. PATENT DOCUMENTS

| | | |
|---|---|---|
| 2,723,517 | 11/1955 | Mittelman . |
| 3,717,539 | 2/1973 | Roberts ............................... 156/580.1 |
| 4,403,465 | 9/1983 | Bachner .............................. 156/580.2 |
| 4,512,136 | 4/1985 | Christine ................................ 53/133.2 |
| 4,517,790 | 5/1985 | Kreager ................................ 53/DIG. 2 |
| 4,711,693 | 12/1987 | Holze ................................. 156/580.2 |
| 4,732,299 | 3/1988 | Hoyt ..................................... 53/133.2 |
| 4,767,492 | 8/1988 | Fukusima et al. ................... 53/DIG. 2 |
| 5,058,364 | 10/1991 | Seiden et al. ............................ 53/455 |
| 5,110,040 | 5/1992 | Kalbener et al. .................... 53/DIG. 2 |

FOREIGN PATENT DOCUMENTS

| | | |
|---|---|---|
| 60-139754 | 9/1985 | Japan . |
| 60-187032 | 12/1985 | Japan . |
| 63-76653 | 5/1988 | Japan . |

*Primary Examiner*—James F. Coan
*Assistant Examiner*—Gene L. Kim
*Attorney, Agent, or Firm*—Frishauf, Holtz, Goodman, Langer & Chick

[57] ABSTRACT

There is disclosed a process for producing a self-supporting package having an outlet stopper which comprises: (a) a process for supplying a self-supporting bag which has an opening part for filling contents at the top thereof and holding the bag at a vertical position, (b) a process for opening the opening part of the self-supporting bag, (c) a process for filling the self-supporting bag with contents, (d) a process for supplying an outlet stopper which has an outlet with a stopper on a ship-shaped flange to the opening part, and (e) a process for sealing the side faces of the ship-shaped flange of the main part of the outlet stopper to the inner side faces of the opening part of the self-supporting bag. These processes are conducted in the order of the processes (a), (b), (c), (d) to (e), consecutively. An apparatus comprising mechanisms corresponding to the processes (a) to (e) is also disclosed. The self-supporting package having an outlet stopper and filled with contents can be produced with high productivity. Shape of the self-supporting package can be freely selected. Sealing time is shorter than that of conventional heat sealing processes. The sealing can be surely achieved even when foreign substances are present on the face of sealing. The self-supporting package produced has excellent sealing stability and simple structure, is provided with an outlet stopper at the top of the package, and is easy for handling.

23 Claims, 9 Drawing Sheets

F i g. 14
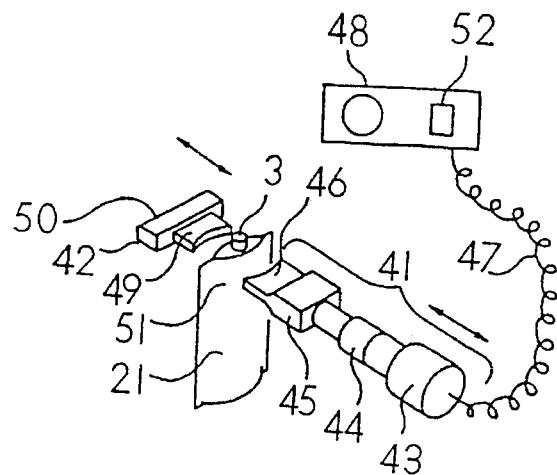
F i g. 15
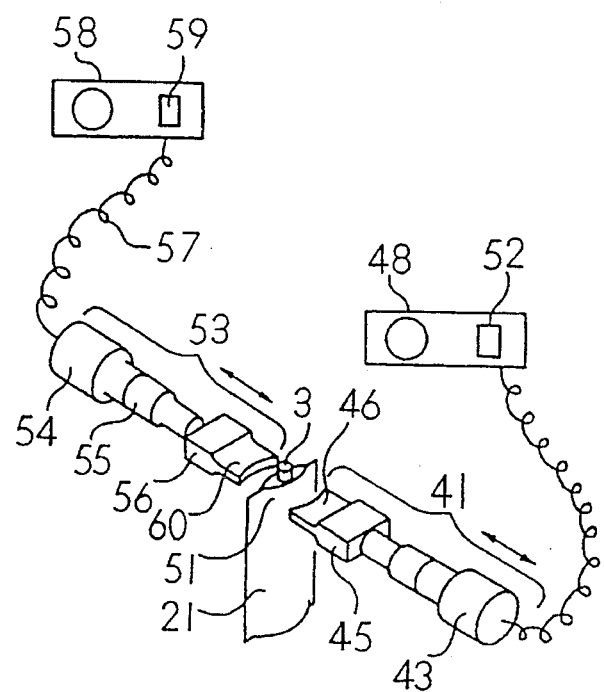

PROCESS FOR PRODUCING A SELF-SUPPORTING PACKAGE HAVING AN OUTLET STOPPER AND AN APPARATUS FOR PRODUCING SAID PACKAGE

BACKGROUND OF THE INVENTION

1. Field of the Invention

The present invention relates to a process for producing a self-supporting package having an outlet stopper which is used for containing fluid materials, and an apparatus for producing said package. More particularly, the present invention relates to a process for producing a self-supporting package which comprises holding a self-supporting bag having a sealing layer made of a thermoplastic resin on the inner side at a vertical position, filling contents after opening an opening part of the self-supporting bag, supplying an outlet stopper made of a thermoplastic resin to the opening part, and sealing the outlet stopper and the opening part together, and an apparatus for producing said package. The present invention relates to the process and the apparatus having such advantages that the self-supporting bag can be filled with contents at a high speed, that excellent sealing can be realized in a short time by sealing the layer on the self-supporting bag and the outlet stopper together by the ultrasonic vibration, and that the sealing can be surely achieved even when foreign substances are present on the face of sealing.

2. Description of the Related Art

Commercial products which have heretofore been sold in bottles of glass or hard plastics, such as milk, soy sauce, oil, cosmetics and other like products of a fluid or slurry form, are recently sold in packages of paper cartons, bottles of thin plastic sheets, and bags of plastic films (pouches).

An outlet stopper is attached to paper cartons and thin plastic bottles. A necessary amount of the content is taken out each time from the package through the outlet stopper and the remaining amount is kept in the package by closing the outlet stopper. Pouches having an outlet stopper are also used. Pouches having the self-supporting property which can stand self-supported on a table in the condition filled with contents are produced for realizing still easier handling in use.

As the self-supporting package having an outlet stopper, a package having an opening part at the top is preferred. Self-supporting packages having an opening part at the top, such as those shown in FIG. 1 [Japanese Utility Model Application Laid-Open No. Showa 60(1985)-139754] and in FIG. 2 [Japanese Utility Model Application Laid-Open No. Showa 63(1988)-76653], are currently produced. However, the self-supporting packages shown in FIGS. 1 and 2 have drawbacks in that bulkiness of the main part 1 of the outlet stopper causes a problem in the process of supplying the self-supporting bag, and that speed of filling contents from the inlet-outlet 2 of the main part of the outlet stopper 1 is very low because the inlet-outlet is generally small and increase in the productivity is difficult. For increasing the productivity by increasing the speed of filling, a method in which a large open part 4 is formed in addition to the outlet stopper 3 as shown in FIGS. 3 and 4, and the large open part is closed by heat sealing after the package is filled with contents, has been adopted. However, this method has drawbacks in that bulkiness of the outlet stopper makes a problem in the process of supplying the self-supporting bag and that the outlet stopper cannot be formed at the central top of the self-supporting package and the shape of the package is limited.

As the method of sealing or adhering a packaging bag having a sealing layer of a thermoplastic resin to an outlet stopper made of a thermoplastic resin, a method of heat sealing, a method of using an adhesive, and a method of sealing with high frequency dielectric heating or dielectric heating, have heretofore been known.

Among these methods, the method of using an adhesive has drawbacks in that time and care are required, that a long time is necessary for curing, that smell remains after the adhesion, and that many types of adhesive cannot be used depending on contents, and this method is not practically used. The method of sealing with high frequency dielectric heating has drawbacks in that thermoplastic resins generating heat with high frequency dielectric heating are limited to resins having a large dielectric loss such as polyvinyl chloride and polyvinylidene chloride, and that a special method, such as mixing metal powder into the thermoplastic resin to be heated or burying pieces of metal in a packaging bag or an outlet stopper, must be used because the high frequency dielectric heating is conducted by making use of ohm loss caused by the vortex current induced in the material to be heated which is a conductive material like a metal. Therefore, application of this method is naturally very limited. The method of heat sealing is conducted by heating a packaging bag and an outlet stopper with a heating plate from the outside of the packaging bag while they are pressed together. The principle of the heat sealing is to make use of heat transfer and simple. The heat sealing can be surely performed by using a suitable condition so long as the material of the sealing layer at the inner face of the packaging bag and the material of the outlet stopper are the same. Therefore, the method of heat sealing is generally used.

Recently, sealing methods of an outlet stopper using ultrasonic vibration have been proposed. An example of such method was disclosed in Japanese Utility Model Application Laid-Open No. Showa 60(1985)-187032. In the disclosed method, an outlet stopper like a round stopper having a cylindrical sealing face is sealed by the ultrasonic vibration to a plastic film before the plastic film is processed to the form of a bag, and then a packaging bag is prepared from the plastic film having the outlet stopper. This method of preparation of a bag inevitably requires that the packaging bag has a shape in which the outlet stopper is attached to the front side part or the back side part. The outlet stopper at the side part disturbs the operation of filling contents in the process that follows. This causes difficulty for automation and also requires a complicated process to seal the open part again. Therefore, the disclosed method is inferior as an industrial process with respect to workability as well as to productivity.

A method of heat sealing a packaging bag and an outlet stopper together which has heretofore been used widely is described in the following with reference to FIGS. 5, 6 and 7. FIG. 5 show the whole part of an outlet stopper 3. The outlet stopper is composed of the main part 1 and a cap 5. Closing and opening of the main part 1 with the cap 5 are made by using a screw formed on each of the main part 1 and the cap 5. The main part 1 is made of a thermoplastic resin and generally produced by a molding method, such as injection molding. As the shape of the sealing part 6 of the outlet stopper, a shape such as that of the ship-shaped flange 7 shown in the figure is preferable because a large area can be obtained for sealing with the packaging bag. One to several ribs 8 for sealing may be formed on the sealing face of the ship-shaped flange 7. The cap 5 is made of a synthetic resin such as a thermoplastic resin or a metal such as aluminum. Material of the cap is not limited so long as the cap 5 and the main part 1 of the outlet stopper can be screwed into each other and closed together tightly.

FIG. 6(A) shows a packaging bag 9 in the condition before the main part 1 of the outlet stopper is inserted into the opening part 4 at the top of the bag. FIG. 6(B) shows the packaging bag in the condition after the main part 1 of the outlet stopper is inserted into the opening part 4 and sealed to the bag. Before the outlet stopper 3 is sealed, the packaging bag 9 has the shape of so called three side sealed bag in which the bottom part and both side parts have been sealed with a suitable method such as heat sealing. The material film of the packaging bag generally has a single layer structure or a multi-layer structure having two or more layers made of thermoplastic resins. As material of the innermost layer, a material of the same type as that of the sealing part 6 of the main part 1 of the outlet stopper is generally used to assure strength of the sealing. When the sealing of the outlet stopper to the packaging bag 9 is made after the packaging bag 9 is filled with contents, the main part 1 of the outlet stopper is generally sealed to the packaging bag while the cap 5 is screwed into the main part 1 of the outlet stopper. When the sealing is made before the bag 9 is filled with contents, the main part 1 of the outlet stopper is generally sealed to the packaging bag while the cap 5 is taken off from the main part 1 of the outlet stopper, and the cap 5 is screwed into the main part 1 of the outlet stopper after the bag is filled with contents from the inlet-outlet 2.

FIG. 7 shows a perspective view illustrating the sealing process of an outlet stopper by heat sealing when the outlet stopper 3 is inserted into the packaging bag 9 by a suitable method, placed at a specified position and sealed to the packaging bag. Ends of the sealing plate 10 and the sealing plate 11, which are arranged at the positions facing to each other, have each a shape corresponding to that of the sealing part 6 of the ship-shaped flange 7 of the outlet stopper which is shown in FIG. 5, and also have each straight side parts 12 which are straightly extended sideward from the shape corresponding to that of sealing part 6 so that the side parts of the packaging bag shown in FIG. 6 can be sealed simultaneously.

Sealing plates 10 and 11 are each connected to heating plates 13 and 14 by forming into a single body or by using bolts. The sealing plates 10 and 11 and the heating plates 13 and 14 are made of a metal such as aluminum, stainless steel, and steel. The heating plates have each a heating device such as a cartridge heater buried in it or a heater plate attached to the surface, and a temperature sensor to control the heating plate at a temperature suitable for heat sealing.

The heating plates 13 and 14 move away from or to each other to open or close the heating plates, respectively, as shown by the arrows in the figure. After the outlet stopper 3 is inserted into the packaging bag 9, the heating plates 13 and 14 move to each other to close the plates when center of the outlet stopper 3 inserted into the packaging bag 9 reaches the position at the center of the sealing plates 10 and 11 which are arranged at positions facing to each other. The sealing layer which is the innermost layer of the packaging bag 9 and the ship-shaped flange 7 are heated and sealed to each other by pressing the heating plates 13 and 14 to the ship-shaped flange of the main part 1 of the outlet stopper for a specified time at a suitable pressure. Then, the heating plates 13 and 14 move away from each other to open them. By repeating this operation twice or more, a strong sealing can be achieved.

The heating plates 13 and 14 are driven by a suitable mechanism such as an air cylinder, an oil pressure cylinder, and mechanical cam driving. Time necessary for one sealing is 1 to 3 seconds, 1.5 seconds in general, although the time is different depending on material and thickness of the packaging bag 9, material of the ship-shaped flange 7 of the main part 1 of the outlet stopper, area for the sealing, and pressure for the sealing. Because sufficient sealing strength cannot be obtained by one sealing operation alone, the sealing operation is repeated 2 to 3 times. Furthermore, a process for cooling the sealed part is required to cool the sealed part quickly and prevent detachment of the sealed part. Therefore, increase in the productivity is limited by these factors. Particularly, when a bag is filled with contents through the outlet-inlet 2 of the main part 1 of the outlet stopper shown in FIG. 6 after the outlet stopper 1 is sealed to the packaging bag 9, the time required for filling the packaging bag with the contents, in other words the filling speed, is decreased to a large extent because the outlet-inlet is small. Therefore, increase in the productivity is further difficult.

When the packaging bag is filled with contents while the opening part 4 in the packaging bag 9 is open, in other words, when the packaging bag is filled with contents at a high speed while a large opening is made in the packaging bag before the outlet stopper is attached to the packaging bag and then the outlet stopper 3 is sealed to the bag, problems such as those described in the following arise. When the contents are fluid, the fluid contents tend to adhere to the sealing face of the packaging bag 9. The adhered fluid works as a foreign substance and is vaporized by the heat of the sealing. This causes formation of bubbles on the sealed part and formation of so called blisters. When these phenomena occur to a large extent, defect sealing such as a broken bag at the sealed part frequently takes place. When solid contents adhere to the sealing part, such a trouble that the sealing cannot be made at all arises and reliability of the sealing to keep the contents is all lost. Particularly, when the content is a food, germs invade into the package through the defect sealed part to cause rot by the contamination with the germs. When the content is a drug which requires the sterile condition, the worst result of contamination with germs arises.

SUMMARY OF THE INVENTION

The present invention accordingly has an object to provide a self-supporting package which is produced with excellent workability, is filled with contents at a high filling speed, can be provided with an outlet stopper by sealing in a short time and by using an apparatus of a simple structure, can be produced with reliable sealing even when foreign substances are present at the sealing face, and with excellent sealing stability, can be produced also with high productivity, and has an outlet stopper at the top of the package for easy handling to consumers. The present invention has another object of providing an apparatus for producing said self-supporting package having similar advantages.

As the result of the extensive studies undertaken by the present inventors to develop a process efficiently producing a self-supporting package which can be handled easily and has excellent sealing stability, it was discovered that an excellent self-supporting package can be produced without adverse effect on the productivity when the package is filled with contents through a large opening part for filling contents at the top of the bag, then an outlet stopper is attached to the opening part, and the outlet stopper is sealed to the bag by ultrasonic vibration. The present invention has been completed on the basis of the discovery.

Thus, the present invention provides:

[1] A process for producing a self-supporting package having an outlet stopper which comprises:
(a) a process for supplying a self-supporting bag which has an opening part for filling contents at the top thereof and holding the bag at a vertical position,
(b) a process for opening the opening part of the self-supporting bag,
(c) a process for filling the self-supporting bag with contents,
(d) a process for supplying an outlet stopper which has an outlet with a stopper on a ship-shaped flange to the opening part, and
(e) a process for sealing the side faces of the ship-shaped flange of the main part of the outlet stopper to the inner side faces of the opening part of the self-supporting bag;

said processes being conducted in the order of the processes (a), (b), (c), (d) to (e), consecutively;

[2] A process for producing a self-supporting package having an outlet stopper according to [1], wherein a process for producing the self-supporting bag which has an opening part for filling contents at the top thereof continuously from a long sheet of a material film for the bag, is conducted before the process (a);

[3] A process for producing a self-supporting package having an outlet stopper according to [1], wherein the whole part including the upper part of the self-supporting bag has the self-supporting property which is provided by side seal lines forming the trunk part of the bag, a constriction part formed by the side seal lines at the middle part of the height of the bag when the bag is in the self-supporting condition, and a pair of linear grooves and a pair of linear ribs each having an approximate shape of arc convex toward the inner side and formed in the trunk part each at a position separated from the side seal line by a distance of 10 to 35% of the width of the bag toward the inner side;

[4] A process for producing a self-supporting package having an outlet stopper according to [1], wherein, in the process (e), an ultrasonic actuator which makes mechanical vibration of an ultrasonic frequency is placed at a position on the axis line perpendicular to the sealing faces of the outlet stopper; an anvil or another ultrasonic actuator is placed at a position on the opposite side of the outlet stopper and on the axis line perpendicular to the sealing faces of the outlet stopper in such a manner that the ultrasonic actuator is faced to the anvil or the other ultrasonic actuator at the opposite side of the outlet stopper; the ultrasonic actuator at one side and the anvil or the other ultrasonic actuator at the opposite side are driven to open or close along the axis line perpendicular to the sealing faces of the outlet stopper in a synchronized manner; and the side faces of the ship-shaped flange of the outlet stopper are sealed to the inner side faces of the opening part of the self-supporting bag;

[5] A process for producing a self-supporting package having an outlet stopper according to [4], wherein resonance frequencies of the ultrasonic actuators at both sides are different from each other;

[6] A process for producing a self-supporting package having an outlet stopper according to [4], wherein the ultrasonic actuators at both sides are driven by one ultrasonic vibration generator having a switching function in such a manner that the actuators at both sides are consecutively driven by the switching function of the ultrasonic vibration generator;

[7] A process for producing a self-supporting package having an outlet stopper according to [4], wherein, a process for temporary sealing in which the both faces for sealing are spot sealed by lightly pressing the outside of the opening part of the self-supporting bag toward the ship-shaped flange of the outlet stopper from one or two directions by using a heated rod of a controlled temperature, by ultrasonic vibration, or by high frequency wave, is conducted after the process (d) and before the process (e);

[8] A process for producing a self-supporting package having an outlet stopper according to [4], wherein method of controlling the ultrasonic vibration is selected from the method of control by the time, the method of control by the moving distance, the method of control by the energy, and a combination of these methods;

[9] A process for producing a self-supporting package having an outlet stopper according to [4], wherein one to several sealing ribs having a width of 0.2 to 0.8 mm and a height of 0.05 to 0.4 mm are formed on both sides of the ship-shaped flange of the main part of the outlet stopper, a plurality of reinforcing ribs are formed in the space between the two sides of the ship-shaped flange, and parts of increased thickness having an arc shape or a tapered shape are formed at joint parts of the reinforcing rib and the ship-shaped flange and/or joint parts of the sides of the ship-shaped flange;

[10] A process for producing a self-supporting package having an outlet stopper according to [4], wherein the working end of a horn in the ultrasonic actuator and/or the receiving part in the anvil has such a shape that the concave part of the working end and/or the receiving part has a radius of curvature which is obtained by adding 0.6 to 1.4 times the thickness of the self-supporting bag to the radius of curvature of the corresponding convex part of the sealing base in the ship-shaped flange, and the convex parts of the working ends and/or the receiving parts have a radius of curvature $r_2$ which is obtained by subtracting 0.6 to 1.4 times the thickness of the self-supporting bag from the radius of curvature of the corresponding concave parts of the sealing base in the ship-shaped flange;

[11] A process for producing a self-supporting package having an outlet stopper according to [4], wherein a process for heat sealing the package obtained in the process (e) is conducted after the process (e);

[12]. An apparatus for producing a self-supporting package having an outlet stopper which comprises:
(a) a mechanism for supplying a self-supporting bag which has an opening part for filling contents at the top thereof and holding the bag at a vertical position,
(b) a mechanism for opening the opening part of the self-supporting bag,
(c) a mechanism for filling the self-supporting bag with contents,
(d) a mechanism for supplying an outlet stopper which has an outlet with a stopper on a ship-shaped flange to the opening part, and
(e) a mechanism for sealing the side face of the ship-shaped flange of the main part of the outlet stopper to the inner side face of the opening part of the self-supporting bag;

said mechanisms being arranged in the order of the mechanisms (a), (b), (c), (d) to (e), consecutively, in the apparatus;

[13] An apparatus for producing a self-supporting package having an outlet stopper according to [12], wherein the mechanism (e) has a construction in which an ultrasonic actuator which makes mechanical vibration of an ultrasonic frequency is placed at a position on the axis line perpendicular to the sealing faces of the outlet stopper, an anvil or another ultrasonic actuator is placed at a position on the opposite side of the outlet stopper and on the axis line perpendicular to the sealing faces of the outlet stopper in such a manner that the ultrasonic actuator is faced to the anvil or the other ultrasonic actuator at the opposite side of the outlet stopper, and the ultrasonic actuator at one side and the anvil or the other ultrasonic actuator at the opposite side are driven to open or close along the axis line perpendicular to the sealing faces of the outlet stopper in a synchronized manner;

[14] An apparatus for producing a self-supporting package having an outlet stopper according to [13], wherein resonance frequencies of the ultrasonic actuators at both sides are different from each other;

[15] An apparatus for producing a self-supporting package having an outlet stopper according to [13], wherein a mechanism in which the actuators at both sides are driven by one ultrasonic vibration generator having a switching function in such a manner that the actuators at both sides are consecutively driven by the switching function of the ultrasonic vibration generator, is comprised; and

[16] An apparatus for producing a self-supporting package having an outlet stopper according to [13], wherein a mechanism for heat sealing the package obtained by the mechanism (e) is comprised after the mechanism (e).

Other and further objects, features and advantages of the invention will appear more fully from the following description.

BRIEF DESCRIPTION OF THE DRAWINGS

The invention will be described with reference to the accompanying drawings, wherein:

FIG. 14 shows a perspective view showing a mode of application of the ultrasonic method of the present invention to the sealing part of the outlet stopper when an ultrasonic actuator and an anvil are used in combination.

FIG. 15 shows a perspective view showing a mode of application of the ultrasonic method of the present invention to the sealing part of the outlet stopper when two ultrasonic actuators and two ultrasonic vibration generators are used in combination.

Figure 1:
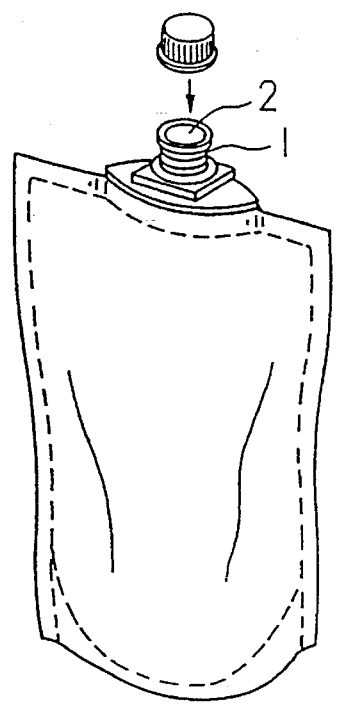
FIG. 1 shows a side view of a conventional self-supporting bag having an outlet stopper.
Figure 2:
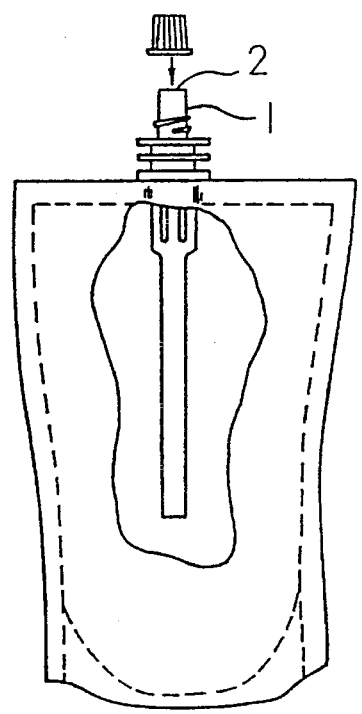
FIG. 2 shows a side view of a conventional self-supporting bag having an outlet stopper.

The numbers and characters in the figures have the meanings as listed in the following:

1: the main part of an outlet stopper
2: an inlet-outlet
3: an outlet stopper
4: an opening part
5: a cap
6: a sealing part of an outlet stopper
7: a ship-shaped flange
8: a sealing rib
9: a packaging bag
10: a sealing plate
11: a sealing plate
12: a straight part
13: a heating plate
14: a heating plate
15: a side seal line
16: linear grooves and linear ribs
17: a heat seal line
18: a heat seal line
19: a folded part
20: a magazine
21: a self-supporting bag
22: a gripper
23: a vacuum sucking plate
24: an air blowing nozzle
25: an apparatus for quantitative supply
26: a screw part
27: an outlet hole
28: a top end part
29: an end part of a flange
30: an end part of a flange
31: a side part of sealing
32: a sealing base
33: an upward convex part
34: an upward concave part
35: a space part 36: a reinforcing rib
37: a joint part of a reinforcing rib
38: a joint part
39: a gripping flange
40: a sealing apparatus
41: an ultrasonic actuator
42: an anvil
43: an ultrasonic vibration element
44: a booster
45: a horn
46: a working end
47: a high frequency cable
48: an ultrasonic vibration generator
49: a receiving part
50: the main part of an anvil
51: a sealing part
52: a timer
53: an ultrasonic actuator
54: an ultrasonic vibration element
55: a booster
56: a horn
57: a high frequency cable
58: an ultrasonic vibration generator
59: a timer
60: a working end
61: an ultrasonic actuator
62: an ultrasonic vibration element
63: a high frequency cable
64: an ultrasonic vibration generator of the switching type
65: a timer
66: a timer
67: a top end side
68: a screw part
69: a bottom end side
70: an upward convex part of a horn
71: au upward concave part of a horn
72: an upward convex part of an anvil
73: an upward concave part of an anvil
74: a cooling apparatus
75: a roll
76: a sheet of material film
77: a process for punching holes in the bottom part
78: a process for transferring a sheet of material film
79: a process for folding and inserting the bottom part
80: a process for sealing the bottom part
81: a process for sealing the side parts
82: a punching process

DETAILED DESCRIPTION OF THE INVENTION

The present invention is described in more detail with reference to examples in the following.

The self-supporting package of the present invention is a self-supporting package having an outlet stopper prepared by the process in which, after a self-supporting bag is filled with contents through an opening part for filling contents at the top of the bag, an outlet stopper is supplied to the opening part, and the side parts of the ship-shaped flange are sealed to the inner sides of the opening part by the ultrasonic vibration. The self-supporting package is characterized in that the package is produced by sealing the outlet stopper to the bag after the bag is filled with contents. The self-supporting bag in the present invention means a bag which keeps a specified shape and stands self-supportedly on a plane when the bag is filled with contents.

Figure 3:
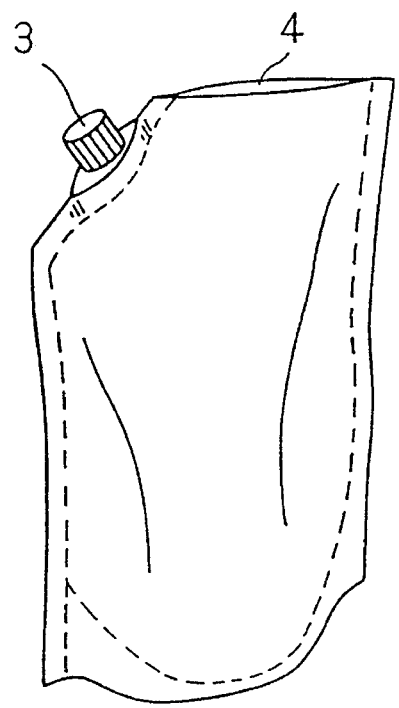
FIG. 3 shows a side view of a conventional self-supporting bag having an outlets stopper.
Figure 4:
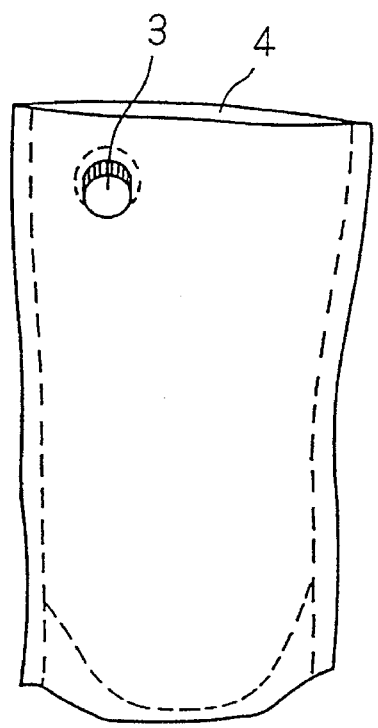
FIG. 4 shows a side view of a conventional self-supporting bag having an outlet stopper.

The self-supporting package of the present invention can be filled with contents through a large opening part for filling contents which is placed at the top of the bag and filled with contents at the same speed as those of the conventional pouches having no stopper and bags having stoppers at the side of the bag shown in FIGS. 3 and 4. A bag having a constriction on the side seal lines, linear grooves and ribs on the surface of the bag, and self-supporting property in the whole parts of the bag including the upper parts, is preferably used as the self-supporting bag of the present invention.

The self-supporting bag of the present invention is composed of the part constituting the trunk and the part constituting the bottom each made of a plastic film. The type of the plastic film is not limited but various types of plastic film can be used. Examples of the plastic used for the plastic film include polyolefins, such as polyethylene and polypropylene; polyolefins containing chlorine, such as polyvinyl chloride; aromatic vinyl polymers, such as polystyrene; polyurethanes; polyesters, such as polyethylene terephthalate; polyamides, such as nylon; polycarbonates; polyarylates; polyethers; copolymers of ethylene with copolymerizable monomers, such as ethylene-vinyl acetate copolymers and ethyleneacrylic acid copolymers; ionomers; and the like. The plastic film may be used singly or as a combination of two or more types. When the part constituting the trunk and the part constituting the bottom of the bag are separately prepared, these parts may be made of the same material or different materials. However, it is preferable that these parts are made of the same material because of easier adhesion. The plastic film may have a single layer structure. However, a multi-layer structure having two or more layers is preferable for the process for production of the self-supporting bag.

As the multi-layer plastic film having two or more layers, a multi-layer film containing various types of laminated plastic layer, such as layers of the plastics described above and other plastics, can be used. A multi-layer plastic film containing laminated layers of plastics having different melting points is preferable. When the multi-layer plastic film containing laminated layers of plastics having different melting points is used, the plastic layer having a lower melting point is placed at the inner side of the package and used for the sealing. Difference in the melting points is not particularly limited, but preferably 10° C. or more, more preferably 20° C. or more, and most preferably 30° C. or more.

Examples of the plastic layer having a lower melting point include layers of polyolefins, such as polyethylene, polypropylene, and the like. Examples of the plastic layer having a higher melting point include layers of engineering plastics, such as stretched nylon 66, stretched polyethylene terephthalate, and the like.

A plastic film containing aluminum foil, or a plastic layer, such as a layer of saponified ethylene-vinyl acetate copolymers (EVOH), polyvinylidene chloride, and the like, as the intermediate layer may be used for providing the barrier property to the plastic film. A soft laminated film in which a layer made of a material other than plastics, such as aluminum, paper, and the like, is laminated with a plastic layer, may be used as the plastic film. A plastic film printed on it may be used as well.

The self-supporting bag produced by the process of the present invention preferably has the following structure: the bag is composed of the part constituting the trunk and the part constituting the bottom; the part constituting the bottom is folded to make an approximate shape of W by the combination with the parts constituting the trunk; the bag has side seal lines shaping the part constituting the trunk in such a manner that the upper part of the bag has a narrower width than that of the bag at the folded part of the part constituting the bottom; the bag has a constriction part formed by the side seal lines at the middle part of the height of the bag when the bag is in the self-supporting condition; and a pair of linear grooves and a pair of linear ribs each having an approximate shape of arc convex toward the inner side are formed in the trunk part each at a position separated from the side seal line by a distance of 10% or more of the width of the bag toward the inner side and at approximately the same height as that of the constriction. Size of the opening part is preferably 60 mm or more for generally used self-supporting bags in order to increase the productivity by increasing the speed of filling.

Figure 8:
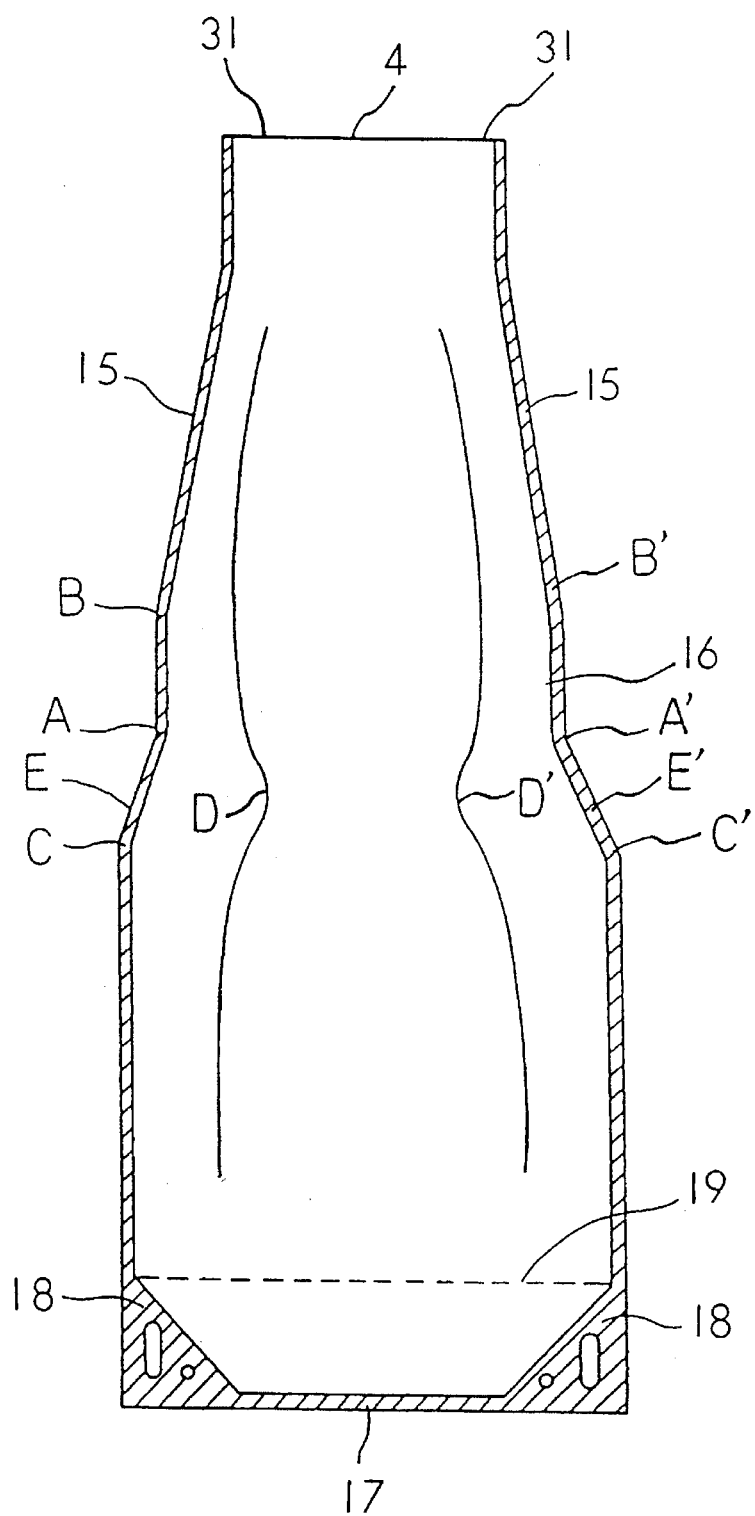
FIG. 8 shows a side view of a self-supporting package.

An example of the shape of the self-supported bag advantageously produced by the process of the present invention is described with reference to the drawings. In FIG. 8, side seal lines 15 which are elements constituting the self-supporting package are formed on the flat part of the part constituting the trunk part by sealing. The side seal lines 15 on the part constituting the trunk of the self-supporting bag have a constriction part at an intermediate position between the points B and C. Width of the bag at the point A in the constriction part is narrower than that at the point C. The point A is located at the inner side of the straight line connecting the points B and C. Distance between the point A and the straight line is preferably 4 to 12% of the width of the bag. Points A', B' and C' and a constriction part are formed on the side seal line 15 at the other side.

The self-supporting bag has a pair of linear groove and a pair of linear rib 16 having a curved part of an approximate shape of an arc convex to the inner side at the inner side of the constriction part and at symmetric positions of both sides. The pairs of linear groove and linear rib 16 are formed on both faces of the part constituting the trunk part. When the points at which a pair of the curve having approximate shape of arc comes closest to each other are designated as D and D', and the points at which the straight line connecting the points D and D' crosses the side seal lines are designated as E and E', the straight line connecting the points D and D' is preferably at a position lower than the straight line connecting the points A and A' by 0 to 20% of the height of the self-supporting bag, and the distance between the points D and E is preferably 10 to 35% of the distance between the points E and E'. The pairs of linear groove and linear rib having approximate shape of arc and convex toward inner side at the constriction part may be extended to the upper and lower parts from the constriction part along the side seal lines. The self-supporting bag is easily folded at the linear grooves and the linear ribs and, when the self-supporting bag is filled with contents, the linear grooves and the linear ribs are folded to form the end part of the concave part formed by the presence of the constriction. The grooves and the ribs assure the formation of this concave part in a specified shape and such an excellent self-supporting property is exhibited that the self-supporting property can be maintained even when the amount of the contents is decreased. Furthermore, because the concave part can be kept at a specified position in a specified shape, a very excellent property of keeping the shape can be obtained.

The part constituting the bottom folded to form the shape of W with the part constituting the trunk is sealed at the heat seal lines 17 and 18 as well as at the side seal lines 15 so that the bottom part takes an approximately hexagonal shape when the self-supporting bag is filled with contents. Length between the folded part 19 and the end of the bottom part can be suitably selected in accordance with the required properties of the self-supporting package, and is preferably 10 to 40% of the width of the self-supporting bag. At the top of the self-supporting bag, an opening part 4 is formed. Width of the opening part is preferably about 50% of the width of the bag at the folded part in the bottom part.

Figure 9:
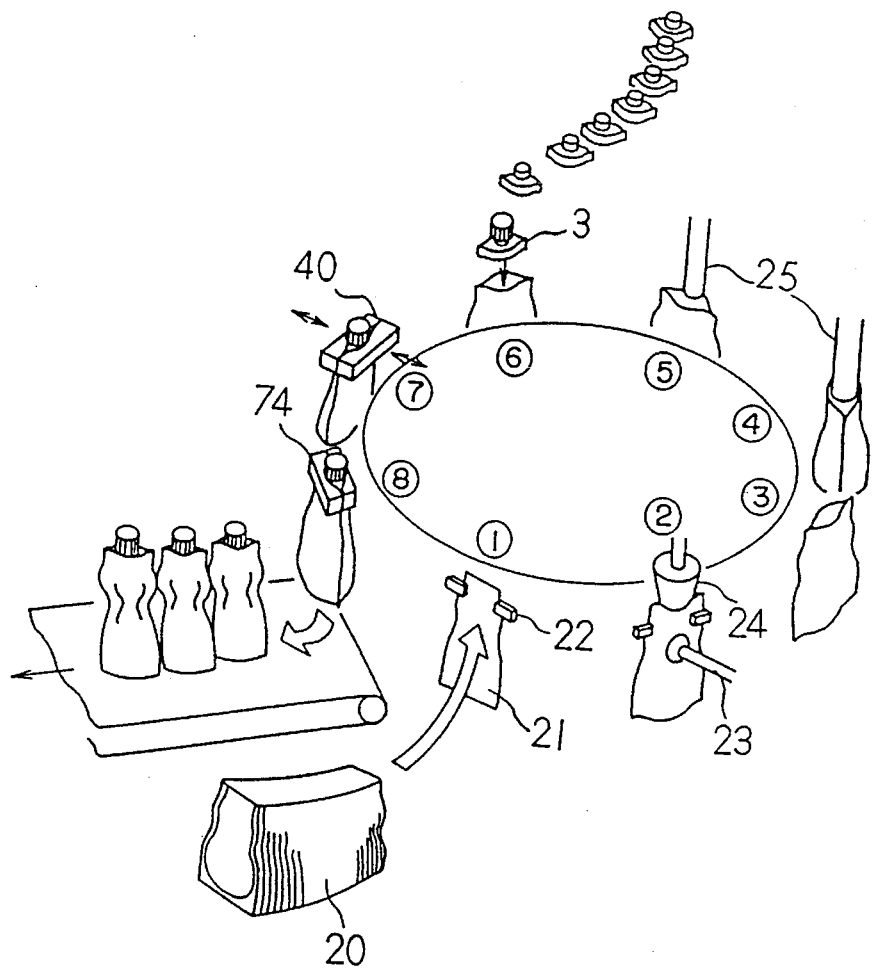
FIG. 9 shows a schematic illustration explaining the process for producing a self-supporting package of the present invention.

In FIG. 9, the self-supporting bag 21 placed on a magazine 20 is transferred to a specified position on the table by the apparatus for supplying a bag and held at a vertical position. Method of holding the bag is not particularly limited. For example, the bag can be held by pinching both ends of the bag with a pair of grippers 22. A process for printing on the bag may be added before or after the process of supplying the bag, if necessary. Then, the self-supporting bag is transferred to the opening process by rotation of the table.

The opening process of the present invention can be conducted, for example, by opening both sides of the self-supporting bag slightly using vacuum suction plates 23 and blowing the air into the bag from the air blowing nozzle 24. After the opening part of the self-supporting bag is opened, the self-supporting bag is transferred to the filling process.

The filling process of the present invention may be arranged in many stages, according to necessity. The fluid used in the present invention is not particularly limited and ranges from a liquid of low viscosity to a paste of high viscosity. Detergents, salad oils, cosmetics, tomato ketchup, mayonnaise, honey, adhesives, and the like, can be used. Solids may be added when the solids are uniformly dispersed or dissolved in a fluid which is filled together. In the filling process, a specified amount of a fluid, a paste, or a solid is filled using a conventional apparatus for quantitative supply 25. The self-supporting bag finished with the filling is transferred to the process of supplying the outlet stopper.

Figure 5:
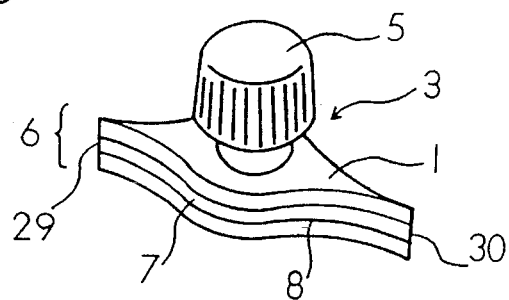
FIG. 5 shows a perspective view of an outlet stopper.

In the process for supplying the outlet stopper of the present invention, an outlet stopper which has an outlet with a stopper on a ship-shaped flange is supplied to the opening part of the bag opened in the preceding process and held at a specified position. Material of the outlet stopper of the present invention is not particularly limited so long as the material can be sealed with the material of the innermost layer of the self-supporting bag. For example, polyethylene, polypropylene, polyester, and the like, can be used. However, the same material as that of the innermost layer is preferably used for surely achieving the sealing. It is preferred that the shape of the outlet stopper of the present invention takes the ship-shape shown in FIG. 5 which has a large sealing area for sealing to the opening part of the bag.

Furthermore, it is particularly preferred that one to several sealing ribs having a width of 0.2 to 0.8 mm and a height of 0.05 to 0.4 mm are formed on both sides of the ship-shaped flange of the outlet stopper where the ultrasonic sealing is made, a plurality of reinforcing ribs are formed in the space between the two sides of the ship-shaped flange, and parts with increased thickness having an arc shape or a tapered shape are formed at joint parts of the reinforcing rib and the ship-shaped flange and/or joint parts of the sides of the ship-shaped flange.

As the shape of the sealing part 6 of the main part 1 of the outlet stopper, the ship-shape of the flange 7 which can have a large sealing area for sealing to the self-supporting bag 21 is preferable. Material of the cap 5 is a synthetic resin such as a thermoplastic resin or a metal such as aluminum. Material, shape and structure of the cap are not otherwise particularly limited so long as screwing and sealing with the main part of the outlet stopper is surely achieved.

In the insertion of the outlet stopper 3 into the self-supporting bag 21, both upper sides of the self-supporting bag 21 are held with sucking by a sucking tool, such as a vacuum sucking plate, and pulled apart to the outward directions. Then, the opening part 4 is fixed in this condition. While the self-supporting bag is held in this condition, the outlet stopper 3 is held with a gripping and inserting tool such as a robot at a position close to the cap 5, or at a specially formed gripping flange 39, inserted into a specified position in the opening part 4 of the self-supporting bag 21, and fixed at this position. It is preferred that a temporary sealing process is conducted at the same time. In the temporary sealing process, the sealing layer of the opening part 4 of the self-supporting bag 21 and the ship-shaped flange 7 of the main part 1 of the outlet stopper are spot sealed together by lightly pressing the opening part 4 from one or both directions at the outside of the bag 21 to the ship-shaped flange 7 with a heated rod or the like which is controlled to a suitable temperature. The rod or the like is not shown in the figure. For the operation of the temporary sealing, suitable methods other than the method of heat sealing with a rod or the like described above, such as the ultrasonic sealing and high frequency method, may also be adopted according to the material.

Figure 10:
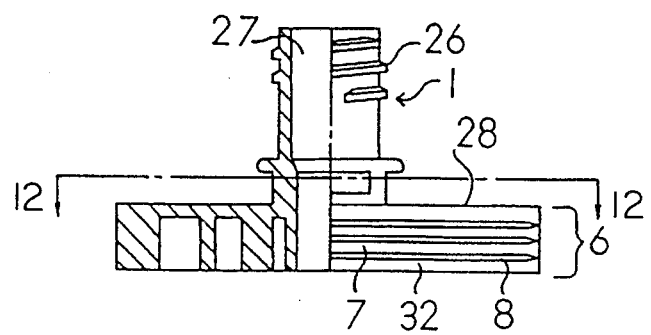
FIG. 10 shows a partially sectional side view of the main part of the outlet stopper.
Figure 11:
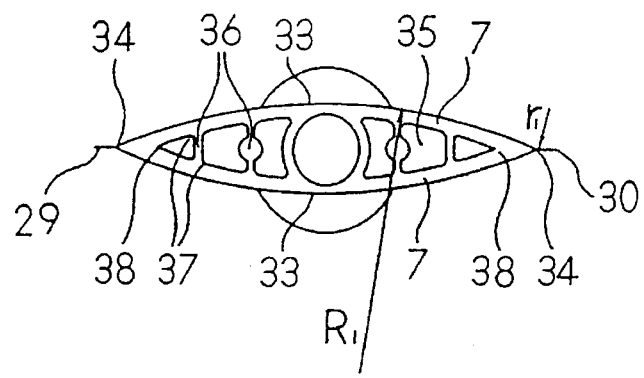
FIG. 11 shows a bottom plan view of the main part of the outlet stopper shown in FIG. 10.
Figure 12:
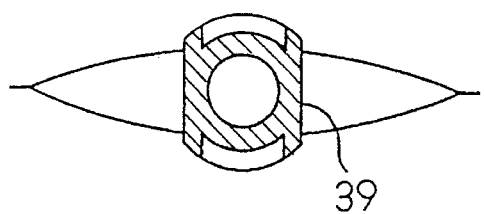
FIG. 12 shows a sectional top view of the main part of the outlet stopper on the line 12—12 shown in FIG. 10.
Figure 13:
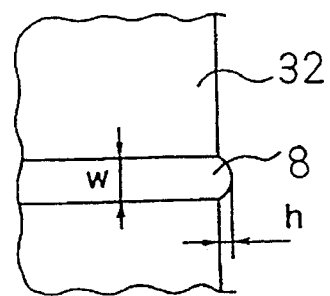
FIG. 13 shows a detail view of the sealing rib part on the main part of the outlet stopper shown in FIG. 10.

An example of the shape of the outlet stopper of the present invention is described with reference to FIGS. 10, 11, 12, and 13. FIG. 10 shows a partially sectional side view of the main part of the outlet stopper. FIG. 11 shows a bottom plan view of the main part of the outlet stopper shown in FIG. 10. FIG. 12 shows a sectional top view of the main part of the outlet stopper on the line 12—12 plane shown in FIG. 10. FIG. 13 shows detail view of the sealing rib part of the main part of the outlet stopper shown in FIG. 10. In FIG. 10, the main part 1 of the outlet stopper has a screw part 26 in the upper part and the stopper can be opened or closed by screwing of the cap 5 shown in FIG. 5. An outlet hole 27 for pouring out contents is formed in the main part 1 of the outlet stopper. The lower part of the main part 1 of the outlet stopper has a ship-shaped flange 7, the sides of which form the sealing part 6 of the outlet stopper. On the sides of the ship-shaped flange 7, one or a plurality of sealing ribs 8 are formed. Three ribs are formed in the example shown in FIG. 10. The opening part 4 of the self-supporting bag 21 shown in FIG. 8 is brought to a position close to the upper end 28 of the sealing part 6 of the ship-shaped flange 7 shown in FIG. 10 and sealed to the sealing part 6 with ultrasonic vibration by the ultrasonic method. In FIGS. 10 and 11, it is preferred that the sealing part 6 of the ship-shaped flange 7 has a convex shape, such as an arc shape or elliptic shape. The arc shape is more preferable because preparation of the mold for molding the main part 1 of the outlet stopper by injection molding or the like is easier and the shape is simple. Therefore, the arc shape is shown in the example. It is preferred that two end parts 29 and 30 of the ship-shaped flange 7 have a shape tapered toward the tip in order that the sealing extending to the side parts 31 of the bag shown in FIG. 8 can be achieved smoothly and surely. The sealing rib 8 of the ship-shaped flange 7 has a shape having a suitable height from the sealing base 32 which is the base part of the sealing part 6 of the outlet stopper, and a convex section. The sealing rib 8 is laid along the arc shape of the sealing base 32. The sealing base 32 has a convex part 33 of a radius of curvature $R_1$ shown in FIG. 11 and the ends 29 and 30 of the ship-shaped flange 7 have each a concave part 34 of a radius of curvature $r_1$ shown in FIG. 11. The convex part 33 and the concave parts 34 connect to each other with the tangents common to the both.

In the space part 35 between the two sides of the ship-shaped flange 7, a plurality of reinforcing ribs are formed and parts of increased thickness having an arc shape or a tapered shape are formed at the joint parts 37 which are the joint parts of the reinforcing ribs 36 and the sides of the ship-shaped flange 7. Parts of increased thickness having an arc shape are also formed at the joint parts 38 where two sides of the ship-shaped flange 7 are jointed. The convex parts 33 are pressed between the horn and the anvil or between the two horns and the reinforcing ribs 36 provides the strength enduring the pressure. When the ship-shaped flange 7 is used in the sealing with the mechanical vibration of the ultrasonic frequency, stress of the high frequency vibration is concentrated at the joint parts 37 and the joint parts 38 and cracks tend to be formed when the joint parts 37 and the joint parts 38 have a shape of a sharp angle. Therefore, the parts of increased thickness having an arc shape or a tapered shape are formed at the joint parts 37 and the joint parts 38 to prevent this phenomenon. This structure is characteristic for the ultrasonic sealing and is not necessary for conventional heat sealing.

FIG. 12 shows a sectional top view of the main part of the outlet stopper on the line 12—12 shown in FIG. 10. A gripping flange 39 having parallel faces is formed at an intermediate position above the ship-shaped flange 7 and below the screw part 26. When the ship-shaped flange 7 of the main part 1 of the outlet stopper is inserted into the opening part 4 of the self-supporting bag 21 shown in FIG. 8, the main part 1 of the outlet stopper is held at the gripping flange 39 with a gripping and inserting tool, such as a robot.

FIG. 13 shows a detail view of the sealing rib 8 formed on both sides of the ship-shaped flange 7 shown in FIG. 10. The figure shows a part of the sealing rib 8 formed in the convex part 33 shown in FIG. 11. Width W and height h of the sealing rib 8 formed on the sealing base 32 are important factors in the ultrasonic sealing. When the sealing layer in the opening part 4 of the self-supporting bag 21 shown in FIG. 8 and the sealing ribs 8 are sealed together by the ultrasonic vibration, the sealing ribs 8 play the roll of an adhesive. The sealing rib melts with the friction heat and the molecular heat and, when the sealing is completed, the sealing layer of the self-supporting bag is sealed directly to the sealing base 32. In the ultrasonic sealing, quality of the sealing is varied depending on length, number, width W, and height h of the sealing ribs 8. Length and number of the sealing rib are the factors directly related to the output power of the ultrasonic vibration generator, and the width and the height of the sealing rib are the factors directly related to reliability of the sealed part. For example, when the width of the sealing ribs 8 is more than 0.8 mm and the height is more than 0.4 mm, time required for the sealing is increased and the sealed part of the self-supporting bag is broken by the severe vibration of the ultrasonic wave. When the width is less than 0.2 mm and the height is less than 0.05 mm, the amount of the material having the function of the adhesive in the sealing is decreased and the sealing becomes incomplete. A width of the sealing ribs 8 of 0.2 to 0.8 mm, preferably 0.3 to 0.6 mm, and a height of the sealing ribs 8 of 0.05 to 0.4 mm, preferably 0.1 to 0.3 mm, are preferable to obtain the excellent ultrasonic sealing. The number of the sealing rib 8 is preferably plural to increase the reliability. The output power of the ultrasonic vibration generator required for the sealing can be decided basically in accordance with the length and the number of the sealing ribs 8.

The self-supporting bag filled with contents and the outlet stopper are transferred to the next sealing process while they are kept at the same relative positions. In the sealing process of the present invention, the inner face of the opening part of the self-supporting bag and the side face of the flange of the outlet stopper can be sealed by using a sealing apparatus 40 for heat sealing, high frequency sealing, ultrasonic sealing, or the like. The ultrasonic sealing is particularly preferable among them. In the ultrasonic sealing used in the present invention, the outlet stopper made of a thermoplastic resin is inserted into the self-supporting bag having the sealing layer made of a thermoplastic resin and sealed together. The process of the present invention has the following characteristics. As the first characteristic of the process: an ultrasonic actuator which generates mechanical vibration of an ultrasonic frequency is placed at a position on the axis line perpendicular to the sealing faces of the outlet stopper; an anvil or another ultrasonic actuator is placed at a position on the opposite side of the outlet stopper and on the axis line perpendicular to the sealing faces of the outlet stopper in such a manner that the ultrasonic actuator is faced to the anvil or the other ultrasonic actuator at the opposite side of the outlet stopper; the ultrasonic actuator at one side and the anvil or the other ultrasonic actuator at the opposite side are driven to open or close along the axis line perpendicular to the sealing faces of the outlet stopper in a synchronized manner; and the side faces of the ship-shaped flange of the outlet stopper are sealed to the inner side faces of the opening part of the self-supporting bag. As the second characteristic of the process: resonance frequencies of the ultrasonic actuators at both sides are different from each other. As the third characteristic of the process: the ultrasonic actuators at both sides are driven by one ultrasonic vibration generator having a switching function in such a manner that the actuators at both sides are consecutively driven by the switching function of the ultrasonic vibration generator. As the fourth characteristic of the process: the working end of a horn in the ultrasonic actuator and/or the receiving part in the anvil has such a shape that the concave part of the working end and/or the receiving part has a radius of curvature which is obtained by adding 0.6 to 1.4 times the thickness of the self-supporting bag to the radius of curvature of the corresponding convex part of a sealing base in the ship-shaped flange and, and the convex part of the working end and/or the receiving part has a radius of curvature which is obtained by subtracting 0.6 to 1.4 times the thickness of the self-supporting bag from the radius of curvature of the corresponding concave part of the sealing base in the ship-shaped flange.

FIG. 14 shows a perspective view showing a mode of application of the ultrasonic method of the present invention to the sealing part of the outlet stopper. An example of the process in which an ultrasonic actuator 41 and an anvil 42 are used in combination is shown in the figure. The ultrasonic actuator 41 is basically composed of an ultrasonic vibration generator 43, a booster 44, and a horn 45. When amplitude of vibration of the working end 46 of the horn 45 is sufficient for ultrasonic sealing, the horn 45 may be connected directly to the ultrasonic vibration generator 43 without using the booster. As the ultrasonic vibration generator 43, any of an electric strain vibration generator and a magnetic strain vibration generator can be used. The electric strain vibration generator is preferable because of superior conversion efficiency of electric energy to mechanical energy. Ultrasonic resonance frequency is 10 to 100 kHz, preferably 15 to 40 kHz, because a larger vibration amplitude can be obtained with less noise. As material of the booster, an aluminum alloy, steel or a titanium alloy is preferable. A titanium alloy is particularly preferable because it has the highest toughness under the high frequency of the ultrasonic vibration and has excellent durability. It is suitable that amplification by the booster 44 is in the range of 1.2 to 4, preferably 1.5 to 2.5, when a titanium alloy is used because formation of crack by the stress concentration can be prevented. As material of the horn 45, a high tension aluminum alloy, such as duralmine and the like, or a titanium alloy, is preferable because of high toughness. It is not desirable that the horn 45 must have a shape generating an excessively large amplitude. Therefore, it is desirable that the amplification is made by the booster 44 in principle and the amplification by the horn is kept at 1 to 2 to avoid excessive load on the horn 45. The amplitude of the working end 46 of the horn 45 is 10 to 120 μm, preferably 30 to 90 μm. When an electric strain type vibration generator is used, the output power of the ultrasonic vibration of 0.5 to 4 KW, preferably 1.5 to 3 KW, is suitable for the object of the present invention. The ultrasonic vibration element 43 of the ultrasonic actuator 41 is connected to the ultrasonic vibration generator 48 with a high frequency cable 47.

The anvil 42 is composed of a receiving part 49 having an end of the same shape as that of the working end 46 of the horn 45 and the main part 50 of the anvil. The receiving part 49 and the main part 50 of the anvil may be formed as a single body or connected with a binding tool such as a bolt. Material of the anvil 42 is a metal, such as aluminum, an aluminum alloy, iron, stainless steel, and the like, or a combination of these metals.

The self-supporting bag 21 and the outlet stopper 3 which have been sealed together temporarily are transferred to the next process of ultrasonic sealing shown in FIG. 9. The ultrasonic actuator 41 and the anvil 42 are placed at positions on the axis line which is perpendicular to the line connecting the end parts 29 and 30 of the ship-shaped flange 7 of the outlet stopper 3. The ultrasonic actuator 41 and the anvil 42 are fixed by a suitable method to a mechanism which can move along the axis line perpendicular to the line connecting the ends 29 and 30 of the flange 7 as shown by the arrow in FIG. 14. The mechanism is, for example, a reciprocally driving mechanism containing an air cylinder, an oil cylinder, a mechanical cam, or a combination of them. The ultrasonic actuator 41 and the anvil 42 wait in the open condition. When the self-supporting bag 21 temporarily sealed with the outlet stopper 3 is supplied and stops at the specified position on the axis line of the ultrasonic actuator 41 and the anvil 42, the ultrasonic actuator 41 and the anvil 42 move to the direction of closing in a synchronized manner and press the sealing parts 51 at both sides of the self-supporting bag 21 simultaneously. In FIG. 14, the ultrasonic actuator 41 moves to the left and the anvil 42 moves to the right. The ultrasonic vibration of the ultrasonic actuator 41 may be started at the time when the movement of the ultrasonic actuator 41 and the anvil 42 to the closing direction is started, at a time in the movement, or at the time when pressing of the sealing part 51 by the ultrasonic actuator 41 and the anvil 42 is started. When the vibration is started while the ultrasonic actuator is pressed to the sealing part 51, the output power of the ultrasonic vibration generator 48 must be large because there is the possibility that an excessive load is added to the ultrasonic vibrating element 43.

It is more efficient that the sealing by pressing is made after foreign substances adhered to the sealing part 51 of the self-supporting bag 21 are flipped away by the ultrasonic vibration. Therefore, it is preferable that the vibration of the ultrasonic actuator 41 is started before the horn 45 is pressed to the sealing part 51. By pressing the working end 46 of the horn 45 which is already vibrating to the sealing part 51, the ship-shaped flange 7 of the main part 1 of the outlet stopper and the sealing layer in the self-supporting bag are mechanically vibrated at a high speed of ultrasonic frequency and sealed by the friction heat and the molecular heat. The mechanical vibration of high frequency is transmitted to the main part 1 of the outlet stopper. The ship-shaped flange 7 and the sealing layer of the self-supporting bag at the side which is pressed by the receiving part 49 of the anvil 42 are also mechanically vibrated with high frequency simultaneously, and sealed by the friction heat and the molecular heat. A cycle of the ultrasonic sealing is finished after the sum of the weld time and the hold time. The weld time is a period of time in which the ultrasonic vibration is continuing. The hold time is a period of time in which the ultrasonic vibration is stopped while the components are kept pressed together and the sealed part is solidified by cooling. These times are set by a timer 52 in the ultrasonic vibration generator 48. It is preferred that the hold time is generally set at about a half or less of the weld time. At the end of the hold time, the ultrasonic actuator 41 and the anvil 42 are opened by moving away from each other simultaneously. The self-supporting package having the outlet stopper is taken out by a suitable method such as dropping and the sealing process is finished.

An example of the process in which two ultrasonic actuators and two ultrasonic vibration generators are used in combination is described in the following with reference to FIG. 15. Basic construction and arrangement comprising an ultrasonic actuator 41, an ultrasonic vibration generators 48 and a self-supporting bag 21 temporarily sealed with an outlet stopper 3 are the same as those shown in FIG. 14. The ultrasonic actuator 53 is composed of an ultrasonic vibration element 54, a booster 55, and a horn 56. Structure, material, and function of the ultrasonic actuator 53 are basically the same as those in the ultrasonic actuator 41. The ultrasonic actuator 53 is connected to an ultrasonic vibration generator 58 with a high frequency cable 57. The ultrasonic actuator 53 is placed at the same position as that of the anvil 42 in FIG. 14, which is the position on the axis of the ultrasonic actuator 41 and faced to the ultrasonic actuator 41 with the outlet stopper 3 between them. The ultrasonic actuators 41 and 53 are fixed by a suitable method to a mechanism which can move along the axis line perpendicular to the line connecting the ends 29 and 30 of the ship-shaped flange as shown by the arrows in FIG. 15. The mechanism is, for example, a reciprocally driving mechanism containing an air cylinder, an oil cylinder, a mechanical cam, or a combination of them. The ultrasonic actuators 41 and 53 wait in the open condition. When the self-supporting bag 21 temporarily sealed with the outlet stopper 3 is supplied and stops at the specified position on the axis line of the ultrasonic actuators 41 and 53, the ultrasonic actuators 41 and 53 move to the direction of closing in a synchronized manner and press the sealing parts 51 at both faces of the self-supporting bag 21 simultaneously. In FIG. 15, the ultrasonic actuator 41 moves to the left and the ultrasonic actuator 53 moves to the right. The ultrasonic vibration of the ultrasonic actuators 41 and 53 may be started at the time when the movement of the ultrasonic actuators 41 and 53 to the closing direction is started, at a time in the movement, or at the time when pressing of the sealing part 51 by the ultrasonic actuators 41 and 53 is started. When the vibration is started while the ultrasonic actuator is pressed to the sealing part 51, the output powers of the ultrasonic vibration generators 48 and 58 must be large because there is the possibility that an excessive load is added to the ultrasonic vibrating elements 43 and 54.

When the outlet stopper 3 is sealed to the self-supporting bag 21 after the bag is filled with contents, it is more efficient that the sealing by pressing is made after foreign substances adhered to the sealing part 51 of the self-supporting bag 21 are flipped away by the ultrasonic vibration. Therefore, it is preferable that the vibration of the ultrasonic actuators 41 and 53 is started before the horns 45 and 56 are pressed to the sealing part 51. The weld time which is the time of ultrasonic vibration and the hold time which is the cooling time are set by the timer 52 in the ultrasonic vibration generator 48 and the timer 59 in the ultrasonic vibration generator 58. At the end of the hold time, the ultrasonic actuators 41 and 53 are opened by moving away from each other simultaneously. The self-supporting package having the outlet stopper is taken out by a suitable method such as dropping and the sealing process is finished.

The more important point of the mode of the process of the present invention described above is that the ultrasonic vibration system (I) composed of the ultrasonic actuator 41 and the ultrasonic vibration generator 48 and the ultrasonic vibration system (II) composed of the ultrasonic actuator 53 and the ultrasonic vibration generator 58 have resonance frequencies different from each other. When the resonance frequencies of the ultrasonic vibration systems (I) and (II) are the same, a problem arises as described in the following: at a moment when the working end 46 of the horn 45 pressed to the sealing part 51 has a movement in the vibration to the left direction in FIG. 15 to press the sealing part 51, the working end 60 of the horn 56 pressed to the sealing part 51 has a movement in the vibration to the left direction in FIG. 15 to release the pressure to the sealing part 51; at another moment when the working end 60 of the horn 56 pressed to the sealing part 51 has a movement in the vibration to the right direction in FIG. 15 to press the sealing part 51, the working end 46 of the horn 45 pressed to the sealing part 51 has a movement in the vibration to the right direction in FIG. 15 to release the pressure to the sealing part 51; these phenomena are repeated and the sealing part 51 just moves to the right or to the left in accordance with the movements of the working ends 46 and 60; the friction heat and the molecular heat which are the source of the heating by the ultrasonic vibration are not generated; therefore, sealing cannot be achieved at all. This problem can be avoided when the resonance frequencies of the ultrasonic vibration systems (I) and (II) are different from each other. The effect exhibited by the different resonance frequencies is very remarkable. For example, when the resonance frequency of the ultrasonic vibration system (I) is 20 kHz, it is desirable that the resonance frequency of the ultrasonic vibration system (II) is different from the value described above by 1 kHz or more, preferably 5 kHz or more.

An example of the process in which two ultrasonic actuators and one ultrasonic vibration generator of the switching type are used in combination is described in the following with reference to FIG. 16. Arrangement of ultrasonic actuators 41 and 61 and the self-supporting bag 21 temporarily sealed with the outlet stopper 3 are the same as those in FIG. 15. The ultrasonic actuators 61 having the same material, construction, and resonance frequency as those of the ultrasonic actuator 41 is used. The ultrasonic vibration element 43 of the ultrasonic actuator 41 and the ultrasonic vibration element 62 of the ultrasonic actuator 61 are connected to an ultrasonic vibration generator of the switching type 64 of the present invention with high frequency cables 47 and 63, respectively. The ultrasonic vibration generator of the switching type 64 of the present invention has one function of generating ultrasonic vibration and the function of switching vibration elements. The ultrasonic vibration generator of the switching type 64 has the function by which two ultrasonic vibration generators required for two ultrasonic actuators in FIG. 15 can be replaced with a single ultrasonic vibration generator. In the switching function of vibration generators, a device for switching contact points, such as a relay, is inserted between the single ultrasonic vibration generator and two high frequency cables 47 and 63 which are connected to the ultrasonic vibrating elements 43 and 62, respectively, and the contact points are switched in such a manner that the combination of the weld time and the hold time is consecutively switched from one of the ultrasonic vibration elements 43 and 62 in the ultrasonic actuators 41 and 61, respectively, to the other. In the present example, the switching is made by the timers 65 and 66 contained in the ultrasonic vibration generator of the switching type 64. The timers 65 and 66 may be units separated from the ultrasonic vibration generator 64 of the switching type and connected to it with cables.

Working of the two ultrasonic actuators 41 and 61 and a single ultrasonic vibration generator of the switching type 64 is specifically described in detail with reference to FIG. 16. The ultrasonic actuators 41 and 61 wait in the open condition. When the self-supporting bag 21 temporarily sealed with the outlet stopper 3 is supplied and stops at the specified position on the axis line of the ultrasonic actuators 41 and 62, the ultrasonic actuators 41 and 61 move to the direction of closing in a synchronized manner and press the sealing parts 51 at both faces of the self-supporting bag 21 simultaneously. In FIG. 16, the ultrasonic actuator 41 moves to the left and the ultrasonic actuator 61 moves to the right. The ultrasonic actuator 41 alone is vibrated first and the sealing is made. Weld time and hold time are controlled by the timer 65. Either at the end of the weld time or at the end of the hold time of the ultrasonic actuator 41, the ultrasonic vibration generator is switched to the ultrasonic actuator 61 by the device for switching contact points and the ultrasonic actuator 61 alone is vibrated with the ultrasonic frequency to make the sealing. Weld time and hold time are controlled by the timer 66. At the end of the hold time controlled by the timer 66, the ultrasonic actuators 41 and 61 are opened by moving away from each other simultaneously. The self-supporting package having the outlet stopper is taken out by a suitable method such as dropping and the sealing process is finished.

In the operation described above, the ultrasonic vibration of the ultrasonic actuator 41 may be started at the time when the movement of the ultrasonic actuator 41 to the closing direction is started, at a time in the movement, or at the time when pressing of the sealing part 51 by the ultrasonic actuator 41 is started. It is preferred that the vibration of the ultrasonic actuator 41 is started before the ultrasonic actuator 41 is pressed to the sealing part 51 because the ultrasonic vibration can be started more easily and foreign substances adhered to the sealing part are flipped away. When it is difficult to start the vibration of the ultrasonic actuator 61 while the ultrasonic actuator 61 is pressed to the sealing part 51, it is preferred that the ultrasonic actuator 61 is pulled back slightly to the opening direction and the ultrasonic actuator 61 is started before it is pressed to the sealing part 51 again, because power required for the vibration of the ultrasonic vibration generator of the switching type 64 can be held low. It is also preferred that the switching from the ultrasonic actuator 41 to the ultrasonic actuator 61 is made at the end of the weld time of the ultrasonic actuator 41 because time of operation can be decreased.

Figure 16:
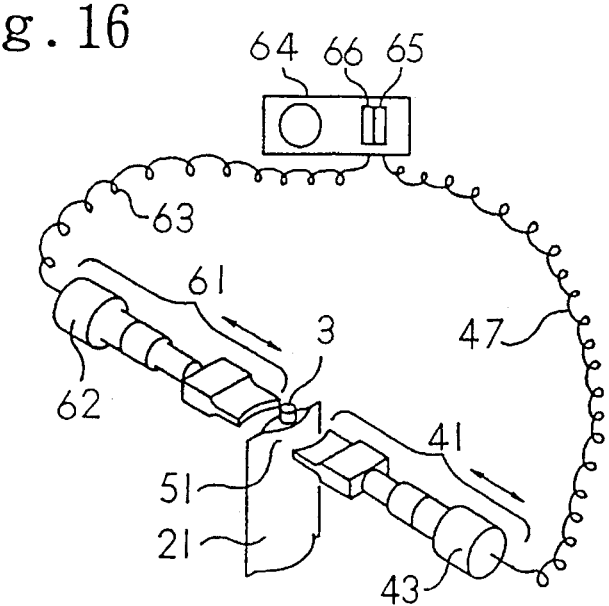
FIG. 16 shows a perspective view showing a mode of application of the ultrasonic method of the present invention to the sealing part of the outlet stopper when two ultrasonic actuators and one ultrasonic vibration generator of a switching type are used in combination.

In the examples with reference to FIGS. 14 to 16, control of the weld time which is the time of ultrasonic vibration has been described by the method of control using a timer. Other methods of control of the present invention, such as the method of control by the moving distance of the horn and the method of control by the energy in which electricity provided to an ultrasonic vibration element is measured for control, are described with reference to examples and FIG. 14 as one of the related figures in the following.

The method of control by the moving distance of the horn is described with reference to FIG. 14. In this method, the time of ultrasonic vibration is controlled by one of the following three moving distances. The first moving distances is the distance from the position where the ultrasonic actuator 41 is in the open condition at the right end of the figure to the position where the sealing is completed. The second moving distance is the distance from the position where a trigger device is operated to the position where the ultrasonic sealing is completed. The trigger device is located at a position between the position where the movement of the ultrasonic actuator 41 to the closing direction is started and the position where the ultrasonic actuator 41 is pressed to the sealing part 51. The trigger device triggers the start of the ultrasonic vibration and is a limit switch or the like. The third moving distance is the distance from the position where the pressure of the ultrasonic actuator 41 on the sealing part 51 reaches a trigger pressure which has been set to a specified value in advance and the position where the ultrasonic sealing is completed. The pressure on the sealing part is measured by a pressure measuring device such as a load cell connected to the ultrasonic actuator 41. The three moving distances can be measure by using a device for measuring the moving distance, such as a displacement sensor like an LED displacement sensor, a laser displacement meter, an ultrasonic displacement sensor, a linear access sensor, and the like; and a device for length measurement like a laser micrometer, a photoelectric sensor, a video sensor, a linear encoder, and the like. Among these devices, the linear encoder is preferable because of a simple structure and superior accuracy. Among the three methods using the three moving distances, the method using the trigger pressure can achieve the best accuracy for realizing better sealing stability. The method using the trigger pressure is described in more detail in the following. When the ultrasonic actuator reaches the position where the pressure reaches the trigger pressure which has been set to a specified value in advance, a trigger signal triggers vibration of the ultrasonic vibration generator 48. The ultrasonic actuator 41 continues moving forward to the pressing direction while the ultrasonic actuator 41 is vibrated by the ultrasonic vibration and the self-supporting bag 21 and the sealing part 51 of the outlet stopper 3 are sealed with the ultrasonic vibration. At the time when the moving distance measured from the position where the ultrasonic vibration is triggered reaches to a moving distance set to a specified value in advance, the ultrasonic vibration is stopped to finish the process of the weld time and, at the same time, the hold time which is the process for cooling is started. Time of the hold time can be set by a conventional timer according to the conventional method.

An example of the method of control by the energy of the present invention is described in the following with reference to FIG. 14. The energy in the present invention is the electric energy required for the ultrasonic vibration generator 48 to generate vibration of the ultrasonic actuator 41 to seal the self-supporting bag 21 and the sealing part 51 of the outlet stopper 3 together, which is integrated over the period of the weld time. The position where the ultrasonic vibration of the ultrasonic actuator 41 is started is detected by a position detecting sensor such as a photoelectric sensor, an access sensor, a limit switch, and the like, similarly to the method of control by the time. The ultrasonic vibration generator 48 is vibrated by the detected signal used as the trigger and the ultrasonic sealing is started. When the electric energy of the ultrasonic vibration generator 48 accumulated in the ultrasonic sealing period which is started by the trigger signal reaches a specific electric energy which is set in advance, process of the ultrasonic vibration which means the weld time is finished and, at the same time, the cooling process which means the hold time is started. The hold time can be set by using a conventional timer according to a conventional method.

For applying the method of control by the moving distance or the method of control by the energy described above with reference to FIG. 14 to the example shown in FIG. 15, the control method is applied simultaneously to both of the ultrasonic vibration system (I) composed of the ultrasonic actuator 41 and the ultrasonic vibration generator 48 and the ultrasonic vibration system (II) composed of the ultrasonic actuator 53 and the ultrasonic vibration generator 58. For applying the method of control by the moving distance or the method of control by the energy described above with reference to FIG. 14 to the example shown in FIG. 16, the method is applied consecutively to one or the other of the ultrasonic actuators 41 and 61 because the ultrasonic actuators 41 and 61 are vibrated consecutively by the ultrasonic vibration generator of the switching type 64. Particularly, the function can be effectively exhibited by adopting the method in which the ultrasonic actuator 61 is temporarily pulled back.

As the method of control of the ultrasonic vibration, a combination of the method of control by the time, the method of control by the moving distance, and the method of control by the energy may be suitably adopted.

Figure 6A:
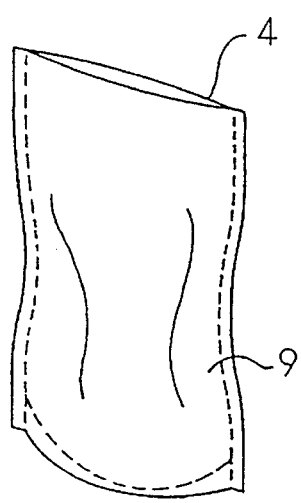
FIGS. 6(A) and 6(B) respectively show a perspective view showing a self-supporting bag before and after an outlet stopper is sealed to it.
Figure 6B:
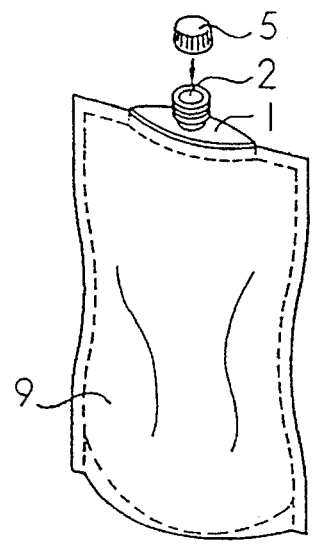
Figures 17A, 17B:
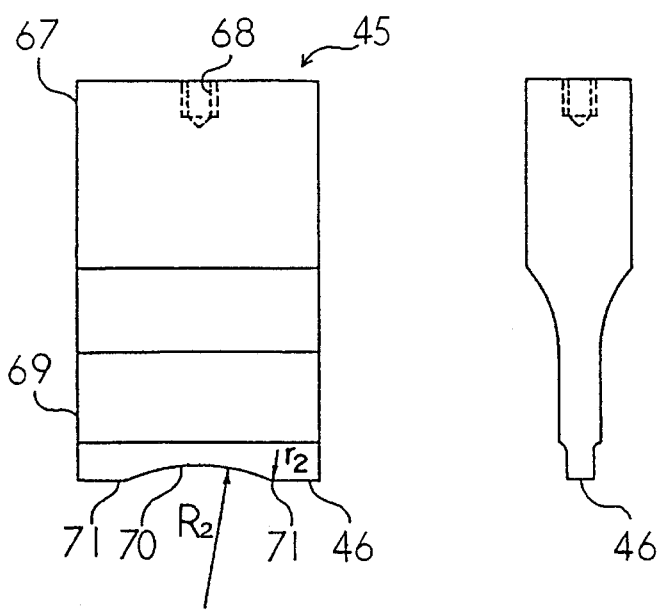
FIGS. 17(A) and 17(B) respectively show a front view and a side view showing a mode of application of a horn.

Shapes of the horn and the anvil are described in the following with reference to FIGS. 17(A), 17(B), 18(A) and 18(B). FIGS. 17(A) and 17(B) show an example of the horn 45 of the present invention. FIG. 17(A) shows a front view and FIG. 17(B) shows a side view. The horn 45 has such a structure that, for example, a screw part 68 for connecting the booster 44 or the ultrasonic vibration element 43 shown in FIG. 14 is formed at the upper end 67 and the amplitude of the ultrasonic vibration can be increased in proportion to the ratio of sectional areas of the upper end 67 and the lower end 69. Length of the working end 46 of the horn 45 is larger than the length of the opening part 4 shown in FIG. 6A. The shape of the working end 46 is the important technical element deciding quality of the ultrasonic sealing. Width of the working end 46 shown in FIG. 17(B) is the same as or more than the height of the sealing part 6 of the outlet stopper in FIG. 10. The working end 46 of the horn has a concave part 70 having the radius of curvature $R_2$ as shown in FIG. 17(A). The working end 46 of the horn also has convex parts 71 which are pressed to the end parts 29 and 30 of the ship-shaped flange of the outlet stopper shown in FIG. 11 and has the radius of curvature $r_2$ as shown in FIG. 17(A). The concave part 70 and the convex part 71 are connected to each other with the tangent common to both parts.

The concave part 70 of the working end has a radius of curvature $R_2$ which is obtained by adding 0.6 to 1.4 times, preferably 0.8 to 1.2 times, the thickness of the self-supporting bag to the radius of curvature $R_1$ of the corresponding convex part 33 of the sealing base 32 in the ship-shaped flange shown in FIG. 11. When an amount less than 0.6 times the thickness of the self-supporting bag is added, sealing around the top of the upward concave part 33 becomes insufficient. When an amount more than 1.4 times the thickness of the self-supporting bag is added, sealing at the end parts 29 and 30 and side parts 31 in FIG. 8 is insufficient.

Similarly, the convex parts 71 of the working end have a radius of curvature $r_2$ which is obtained by subtracting 0.6 to 1.4 times, preferably 0.8 to 1.2 times, the thickness of the self-supporting bag from the radius of curvature $r_1$ of the corresponding concave parts 34 of the sealing base 32 in the ship-shaped flange shown in FIG. 11. When an amount less than 0.6 times the thickness of the self-supporting bag is subtracted, sealing at the end parts 29 and 30 and side parts 31 in FIG. 8 is insufficient. When an amount more than 1.4 times the thickness of the self-supporting bag is subtracted, sealing around the top of the convex part 33 becomes insufficient.

Figures 18A, 18B:
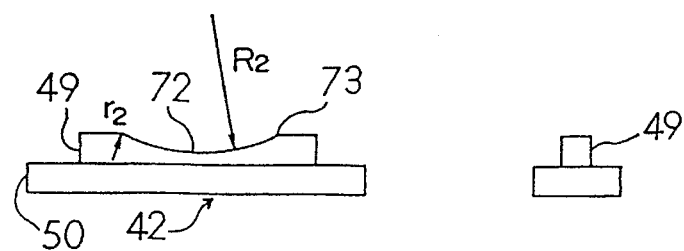
FIGS. 18(A) and 18(B) respectively show a front view and a side view showing a mode of application of an anvil.

FIGS. 18(A) and 18(B) show an example of the anvil 42. FIG. 18(A) shows the front view and FIG. 18(B) shows the side view. The anvil comprises the main part 50 and the receiving part 49. The shape of the receiving part is the important technical factor deciding the quality of the ultrasonic sealing. The receiving part of the anvil has the same shape as that of the working end of the horn 45 shown in FIG. 17(A). The width of the receiving part in FIG. 18(B) is the same as the width of the working end 46 in FIGS. 17(A) and 17(B). The radius of curvature of the concave part 72 of the receiving part 49 of the anvil is the same as the radius of curvature of the concave part 70 of the horn $R_2$. The radius of curvature of the convex parts 73 of the anvil is the same as the radius of curvature of the convex parts 71 of the horn $r_2$.

In the above, the examples of the present invention have been described mainly with reference to FIGS. 14, 15, and 16. In the description, the ultrasonic actuators and anvils are shown to have movements to the horizontal directions. However, the direction of the movement is not particularly limited but may be vertical directions, or inclined directions. For example, the present invention includes a method in which the self-supporting bag is placed vertically, the upper part of the bag is forced to bend 90 degrees, and the ultrasonic actuators are moved approximately vertically for the ultrasonic sealing.

Figure 7:
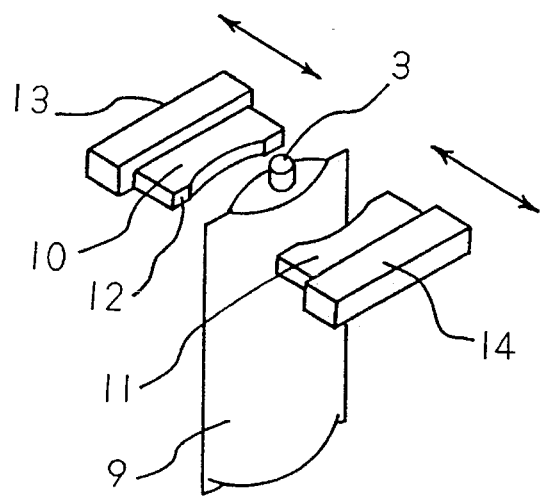
FIG. 7 shows a perspective view illustrating the sealing process of an outlet stopper by heat sealing.

A combination of the ultrasonic sealing and the heat sealing of the present invention is described in the following. When the outlet stopper 3 is sealed to the self-supporting bag 21 by the ultrasonic method described in FIGS. 14, 15, and 16, and then the heat sealing shown in FIG. 7 is applied, more reliable sealing can be achieved. Sealing stability can be significantly increased by the combination of the heat sealing with the ultrasonic sealing, in which the heat sealing is made after foreign substances are flipped away by the ultrasonic sealing. The heat sealing may be conducted once or repeated a plurality of times. The cooling process may be added after the heat sealing process.

It is possible that the sealed part is cooled by a cooling apparatus 74 such as a cooling seal or an air blowing apparatus in the last process of the production. The self-supporting package having the outlet stopper filled with contents is discharged from the table.

In the present invention, the operations of each process can be performed by transferring the product between the processes intermittently with one-pitch movement. Mechanisms of each process can be operated in the manner synchronized with the continuous movement of the self-supporting bag, if necessary.

Figure 19:
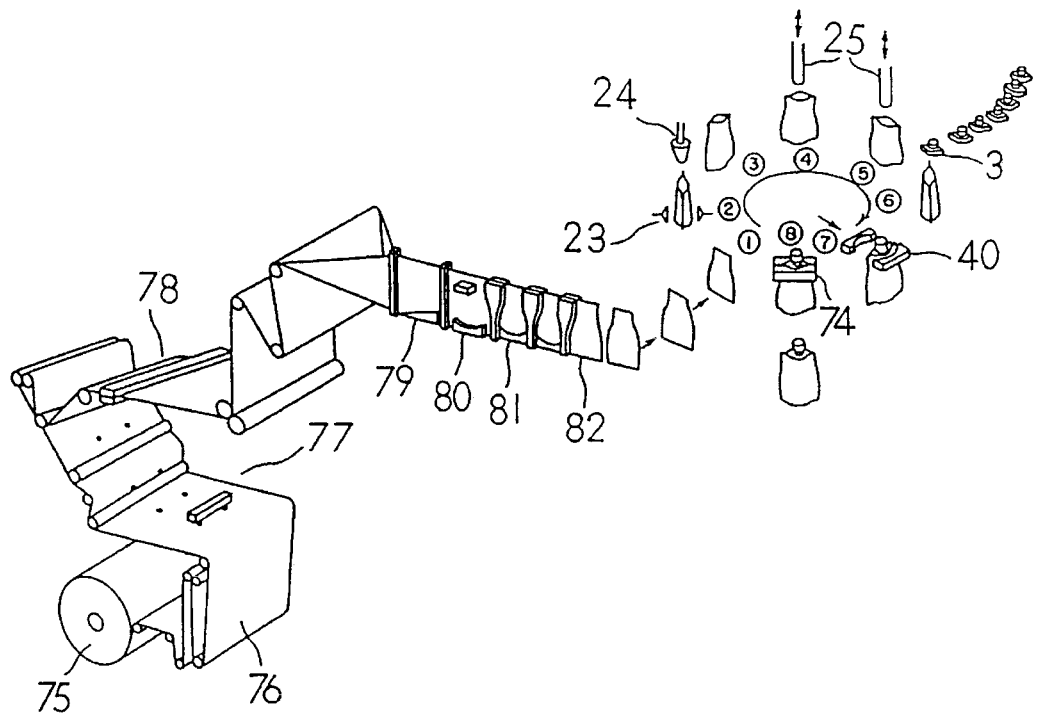
FIG. 19 shows a schematic illustration explaining the process for producing a self-supporting package of the present invention.

A mode of the present invention which includes continuous production of the self-supporting bag from a long sheet of the material film of the package is described in the following. In FIG. 19, the material film 76 sent out from a roll 75 is provided with holes by the process for punching holes in the bottom part 77, folded after passing the process for transferring the sheet of material film 78, and, at the same time, the material constituting the bottom part is inserted in the folded shape in the process for folding and inserting the bottom part 79. A process for forming ribs on the material film (not shown in the figure) is occasionally added to a part of the process of transferring the sheet of material film 78. Then, the film is heat sealed in the process for heat sealing the bottom part 80 and the process for heat sealing the side parts 81, punched to the shape of the self-supporting bag in the punching process 82, supplied to the table similar to that in FIG. 9, and, after the processes for holding, opening, filling, supplying of the outlet stopper, and sealing, the self-supporting package having an outlet stopper is discharged.

Figure 20:
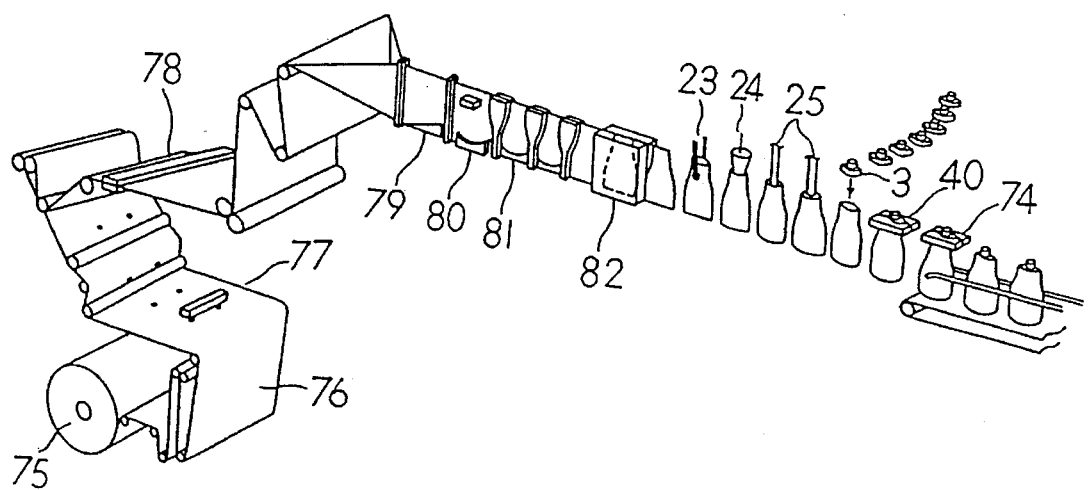
FIG. 20 shows a schematic illustration explaining the process for producing a self-supporting package of the present invention.

In another mode of the present invention, the processes for punching of the self-supporting bag, supplying, holding, opening, filling, supplying an outlet stopper, sealing, and discharge can be arranged on a straight line as shown in FIG. 20.

The apparatus of the present invention is an apparatus for producing the self-supporting package having the outlet stopper which comprises mechanisms having the corresponding functions described in the processes of the process of the present invention in the order of the corresponding processes.

By using a self-supporting bag made of a multi-layer film having the inner layer of polypropylene film and the outer layer of stretched 66 nylon film, and having the height of 26 cm, the width at the folded part 19 of 14 cm, the width of the opening part 4 at the top of the bag of 8 cm, and distance between the folded part 19 and the bottom end part of 4 cm, the present invention was conducted using the apparatus shown in FIG. 9.

The self-supporting bag held in the magazine 20 was supplied to the specified position of the table by using the apparatus for supplying the bag and held approximately vertically by the gripper 22. Both sides of the bag were slightly pulled apart with the vacuum sucking plates 23, and air was blown into the slip thus formed from the air blowing nozzle 24. After the bag was thus opened, the bag was filled with 800 ml of salad oil from the apparatus for quantitative supply 25. Then, the outlet stopper 3 having an outlet with stopper on the ship-shaped flange made of polypropylene was supplied to the opening part 4. The ship-shaped flange of the main part 1 of the outlet stopper and the inner faces of the opening part were sealed together by the ultrasonic sealing. Salad oil adhered to the inner face of the opening part was flipped away by the ultrasonic vibration and a strong sealing was achieved.

To summarize the advantages of the present invention, a self-supporting package having an outlet stopper filled with contents can be produced with high productivity. The shape of the self-supporting package can be freely selected. The sealing time is shorter than that of conventional heat sealing processes. The sealing can be surely achieved even when foreign substances are present on the face of sealing. The self-supporting package produced has excellent sealing stability and simple structure, provided with an outlet stopper at the top of the package, and is easy for handling.

What is claimed is:

1. A process for producing a self-supporting package having an outlet stopper, the process comprising the steps of:
    (a) supplying a self-supporting bag which has an opening part for filling contents at a top of the bag, and holding the bag in a vertical position with the opening part at the top;
    (b) opening the opening part of the self-supporting bag;
    (c) filling the self-supporting bag through the opened opening part, with contents;
    (d) supplying an outlet stopper, which outlet stopper includes an outlet with a stopper on a ship-shaped flange, to the opening part, with at least one raised sealing rib on both sides of the ship-shaped flange; and
    (e) sealing side sealing faces of the ship-shaped flange of the outlet stopper to inner side sealing faces of the opening part of the self-supporting bag;
    wherein said sealing step (e) comprises the steps of:
        placing an ultrasonic actuator, which produces mechanical vibration of an ultrasonic frequency, at a position at one side of the outlet stopper opposite said at least one raised sealing rib and on an axis line perpendicular to the side sealing faces of the outlet stopper;
        placing another member at a position on an opposite side of the outlet stopper opposite said at least one raised sealing rib and on the axis line perpendicular to the side sealing faces of the outlet stopper such that the ultrasonic actuator on said one side of the outlet stopper faces the another member at the opposite side of the outlet stopper; and
        driving the ultrasonic actuator at said one side of the outlet stopper to open or close along the axis line perpendicular to the side sealing faces of the outlet stopper in a synchronized manner, to thereby ultrasonically melt the at least one raised sealing rib on both sides of the side sealing faces of the ship-shaped flange of the outlet stopper and ultrasonically seal the side sealing faces of the ship-shaped flange of the outlet stopper, via the at least one melted sealing rib on both sides of the outlet stopper, to the inner side sealing faces of the opening part of the self-supporting bag; and
    wherein said steps are conducted in the order of steps (a), (b), (c), (d) and (e), consecutively.

2. The process of claim 1, wherein said step of placing said another member at said opposite side of the outlet stopper comprises placing an anvil at said opposite side of the outlet stopper.

3. The process of claim 1, wherein:
    said step of placing said another member at said opposite side of the outlet stopper comprises placing a further ultrasonic actuator at said opposite side of the outlet stopper; and
    said driving step comprises driving both of said first mentioned ultrasonic actuator and said further ultrasonic actuator to thereby ultrasonically seal the side sealing faces of the ship-shaped flange of the outlet stopper to the inner side sealing faces of the opening part of the self-supporting bag.

4. The process of claim 3, wherein the ultrasonic actuators have resonance frequencies which are different from each other.

5. The process of claim 3, wherein the ultrasonic actuators are driven by one ultrasonic vibration generator having a switching function such that the actuators are consecutively and alternately driven by the switching function of said one ultrasonic vibration generator.

6. The process of claim 1, further comprising a step of temporarily spot sealing the side sealing faces of the outlet stopper to the inner side sealing faces of the opening part after said step (d) and before said step (e).

7. The process of claim 6, wherein said step of spot sealing comprises lightly pressing a heated rod of a controlled temperature against an outside portion of the opening part of the self-supporting bag toward the ship-shaped flange of the outlet stopper from at least one direction.

8. The process of claim 7, wherein said step of lightly pressing comprises lightly pressing the outside portion of the opening part of the self-supporting bag toward the ship-shaped flange of the outer stopper from two directions.

9. The process of claim 6, wherein said step of spot sealing comprises applying an ultrasonic vibration device against an outside portion of the opening part of the self-supporting bag toward the ship-shaped flange of the outlet stopper.

10. The process of claim 6, wherein said step of spot sealing comprises applying a high frequency wave emitting device against an outside portion of the opening part of the self-supporting bag toward the ship-shaped flange of the outlet stopper.

11. The process of claim 1, further comprising:

forming at least one said sealing rib having a width of 0.2 to 0.8 mm and a height of 0.05 to 0.4 mm on both sides of the ship-shaped flange of the outlet stopper;

forming a plurality of reinforcing ribs in a space between two sides of the ship-shaped flange; and forming portions of increased thickness at joint portions of the reinforcing ribs and the ship-shaped flange.

12. The process of claim 2, wherein:

the ultrasonic actuator has a horn which has a working end, and the anvil has a receiving part; and the working end of the horn and the receiving part of the anvil have respective shapes such that a concave part of at least one of the working end and the receiving part has a radius of curvature r1 which is obtained by adding 0.6 to 1.4 times a thickness of the self-supporting bag to a radius of curvature of a corresponding convex part of the sealing portion of the ship-shaped flange, and the convex parts of the at least one of the working end and the receiving part have a radius of curvature r2 which is obtained by subtracting 0.6 to 1.4 times the thickness of the self-supporting bag from the radius of curvature of the corresponding concave parts of the sealing portion of the ship-shaped flange.

13. The process of claim 1, further comprising a step of heat sealing the self-supporting package after the step (e).

14. The process of claim 1, wherein said step (a) comprises a step of producing the self-supporting bag, which has said opening part for filling contents at the top thereof, continuously from a long sheet of a film material.

15. The process of claim 14, wherein said step of producing the self-supporting bag comprises:

forming side seal lines on a bag portion forming a trunk part of the bag;

forming a constriction part by the side seal lines at a middle part of a length of the bag when the bag is in a vertical self-supporting condition; and forming a pair of linear grooves and a pair of linear ribs each having an approximate shape of a convex arc which is convex toward an inner side of the bag and which are formed in the trunk part each at a position separated from a side seal line by a distance of 10 to 35% of a width of the bag toward the inner portion of the bag.

16. The combination of claim 7, wherein said another member comprises an anvil arranged at said position on said opposite side of the outlet stopper.

17. The combination of claim 7, wherein said another member comprises another ultrasonic actuator arranged at said position on said opposite side of the outlet stopper.

18. The combination of claim 17, wherein said driver drives both of said ultrasonic actuators at said one side and at said opposite side of said outlet stopper.

19. The combination of claim 18, wherein said driver for driving both of said the ultrasonic actuators comprises a single ultrasonic vibration generator having a switching function such that the respective ultrasonic actuators at both sides of the outlet stopper are consecutively and alternately driven by the switching function of said single ultrasonic vibration generator.

20. The combination of claim 18, wherein the ultrasonic actuators at both sides of the outlet stopper have resonance frequencies which are different from each other.

21. The combination of claim 17, wherein the ultrasonic actuators at both sides of the outlet stopper have resonance frequencies which are different from each other.

22. The combination of claim 7 wherein said apparatus for producing a self-supporting package further comprises a heat sealing mechanism for heat sealing the produced self-supporting package, the heat sealing mechanism being arranged after said sealing mechanism (e).

23. In combination:

an outlet stopper comprising a ship-shaped flange having an outlet with a stopper and at least one raised sealing rib on both sides of the ship-shaped flange; and an apparatus for producing a self-supporting package comprising:

(a) a mechanism for supplying the self-supporting bag which has an opening part for filling contents at the top of the bag, and for holding the bag in a vertical position with the opening part at the top;

(b) a mechanism for opening the opening part of the self-supporting bag;

(c) a mechanism for filling the self-supporting bag, through the opened opening part, with contents;

(d) a mechanism for supplying the outlet stopper to the opening part; and (e) a mechanism for sealing side sealing faces of the ship-shaped flange of the outlet stopper to inner side sealing faces of the opening part of the self-supporting bag;

wherein the sealing mechanism (e) includes:

an ultrasonic actuator, which produces mechanical vibration of an ultrasonic frequency, arranged at a position at one side of the outlet stopper opposite said at least one raised sealing rib and on an axis line perpendicular to the side sealing faces of the outlet stopper;

another member arranged at a position on an opposite side of the outlet stopper opposite said at least one raised sealing rib and on the axis line perpendicular to the side sealing faces of the outlet stopper such that the ultrasonic actuator on said one side of the outlet stopper faces the another member at the opposite side of the outlet stopper; and a driver for driving the ultrasonic actuator at said one side of the outlet stopper to open or close along the axis line perpendicular to the side sealing faces of the outlet stopper in a synchronized manner, to thereby ultrasonically melt the at least one raised sealing rib on both sides of the side sealing faces of the ship-shaped flange of the outlet stopper and ultrasonically seal the side sealing faces of the ship-shaped flange of the outlet stopper, via the at least one melted sealing rib on both sides of the outlet stopper, to the inner side sealing faces of the opening part of the self-supporting bag; and wherein said mechanisms are arranged in the order of the mechanisms (a), (b), (c), (d) and (e), consecutively, in the apparatus.

* * * * *

UNITED STATES PATENT AND TRADEMARK OFFICE
CERTIFICATE OF CORRECTION

PATENT NO. : 5,606,844
DATED : March 4, 1997
INVENTOR(S) : TAKAGAKI et al.

It is certified that error appears in the above-indentified patent and that said Letters Patent is hereby corrected as shown below:

Column 26, line 5 (Claim 16, line 1), "7" should be --23--.
           line 8 (Claim 17, line 1), "7" should be --23--.
           line 26 (Claim 22, line 1), "7" should be --23--.

Signed and Sealed this

Twenty-fifth Day of November, 1997

Attest:

BRUCE LEHMAN

*Attesting Officer*      *Commissioner of Patents and Trademarks*